United States Patent [19]

Sumi

[11] Patent Number: 4,908,093
[45] Date of Patent: Mar. 13, 1990

[54] FILM CONVEYING APPARATUS

[75] Inventor: Sigeo Sumi, Saitama, Japan

[73] Assignee: Somar Corporation, Tokyo, Japan

[21] Appl. No.: 11,469

[22] Filed: Feb. 5, 1987

[30] Foreign Application Priority Data

Feb. 5, 1986 [JP]  Japan .................................. 61-23176
Feb. 24, 1986 [JP]  Japan ................................. 61-38880

[51]  Int. Cl.$^4$ ............................................. B32B 31/18
[52]  U.S. Cl. ................................... 156/584; 156/344; 198/380; 198/493; 198/635
[58]  Field of Search ................. 156/344, 584; 198/380, 198/493, 635

[56]  References Cited

U.S. PATENT DOCUMENTS

| 3,301,603 | 1/1967 | Boon | 198/493 X |
| 3,991,993 | 11/1976 | Clouthier | 270/52.5 |
| 4,261,790 | 4/1981 | Brinker et al. | 156/584 |
| 4,421,608 | 12/1983 | McBride | 156/344 X |
| 4,724,032 | 2/1988 | Kay | 156/344 |

FOREIGN PATENT DOCUMENTS

| 61170 | 9/1982 | European Pat. Off. . |
| 1813262 | 8/1970 | Fed. Rep. of Germany . |
| 1520237 | 4/1968 | France . |
| 1578166 | 8/1969 | France . |
| 59-154447 | 9/1984 | Japan . |
| 2006292 | 5/1979 | United Kingdom . |
| 2181094 | 4/1987 | United Kingdom . |

OTHER PUBLICATIONS

European Patent Office Search Report for EP87101474, dated 1/1989.

Primary Examiner—Robert A. Dawson
Attorney, Agent, or Firm—Sughrue, Mion, Zinn, Macpeak & Seas

[57]  ABSTRACT

A film conveying apparatus for conveying a film by conveyors is provided with a fluid spray mechanism for spraying fluid in a flim discharging direction of the conveyors. A film conveying apparatus is also provided with a container for containing the film conveyed by the conveyors, the container being arranged above a board conveyance path in the board feed side of the film peeling position, with its distance from the film peeling position being small.

18 Claims, 10 Drawing Sheets

FILM CONVEYING APPARATUS

BACKGROUND OF THE INVENTION

This invention relates to a film conveying technique, and more particularly to a technique which can be effectively employed to convey a protective film peeled from the substrate or panel.

In a printed circuit board used in an electronic device such as a computer, a predetermined circuit is formed with copper on one or both sides of an insulated substrate or panel.

A printed circuit board of this type can be manufactured as follows: First, a laminate consisting of a photosensitive resin (photo-resist) layer and a translucent resin film (protective film) for protecting the photosensitive resin layer is thermally formed on the conductive layer of the insulated substrate under pressure. Thereafter, a circuit pattern film is laid over the laminate thus formed, and the photosensitive resin layer is exposed to light through the circuit pattern film and the translucent resin film for a predetermined period of time. After the translucent resin film is peeled off, the photosensitive resin layer thus exposed to light is subjected to developing to form an etching mask pattern. Thereafter, the unnecessary parts of the conductive layer are removed by etching, to obtain a printed circuit board having the predetermined circuit pattern.

In the above-described printed circuit board manufacturing method, in developing the photosensitive resin layer it is necessary to peel the translucent resin film off.

SUMMARY OF THE INVENTION

An object of the present invention is to obtain a film conveyance apparatus which can efficiently and accurately convey and discharge the thin films peeled off.

The above-described object and other objects of the invention and novel features of the invention will become more apparent upon reading the following description in conjunction with the accompanying drawings.

In order to attain the above object, according to the present invention, a film conveying apparatus comprises a film conveyor belt for conveying a film and a fluid spray mechanism for spraying a fluid in a film discharging direction of the film conveyor belt.

Therefore, according to the present invention, the film being discharged is prevented from being wound on the conveyor belt by the sprayed fluid. Furthermore, by the sprayed fluid, the film can be guided surely in the film discharging direction, so that the film can be efficiently discharged out into the peeled film container.

Furthermore, in order to attain the above object, according to the present invention, a film conveying apparatus further comprises a container for containing the film conveyed by the film conveyor, the film container being disposed above a board conveying path in the board feed side of the film peeling position, whereby the film container is three-dimensionally arranged in the film conveying apparatus.

Therefore, according to the present invention, the films formed on one or both sides of the boards are peeled off and automatically discharged by means of peeled film conveyors into the peeled film container arranged above the board conveyance path in the board feed side of the position where the films are peeled off from the boards. Since the peeled film container is arranged above the board conveyance path in the board feed side of the film peeling position, the length of the peeled film conveyors is reduced.

Moreover, since the peeled film container is arranged three-dimensionally above the carrier path of the board, the area required for installing the apparatus is also decreased.

DETAILED DESCRIPTION OF THE PREFERRED EMBODIMENT

This invention will be described in detail with reference to an apparatus for peeling a protective film from a printed circuit board having a protective film conveyance apparatus to which the technical concept of the present invention is applied.

Figure 1:
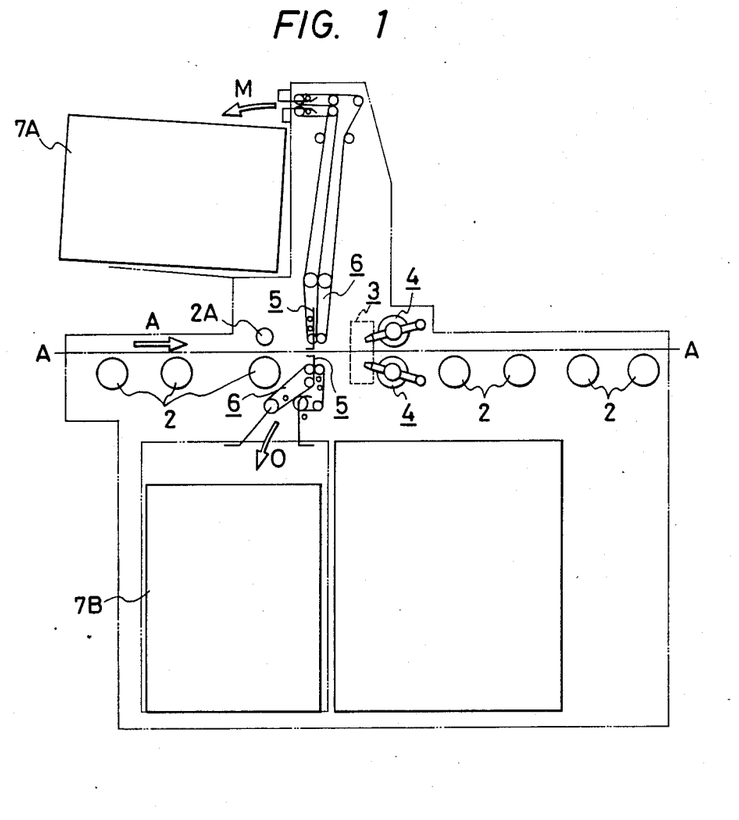
FIG. 1 is a side view showing a schematic construction of an apparatus for peeling a protective film on a board for a printed circuit board and conveying the peeled film, according to the present invention.
Figure 2:
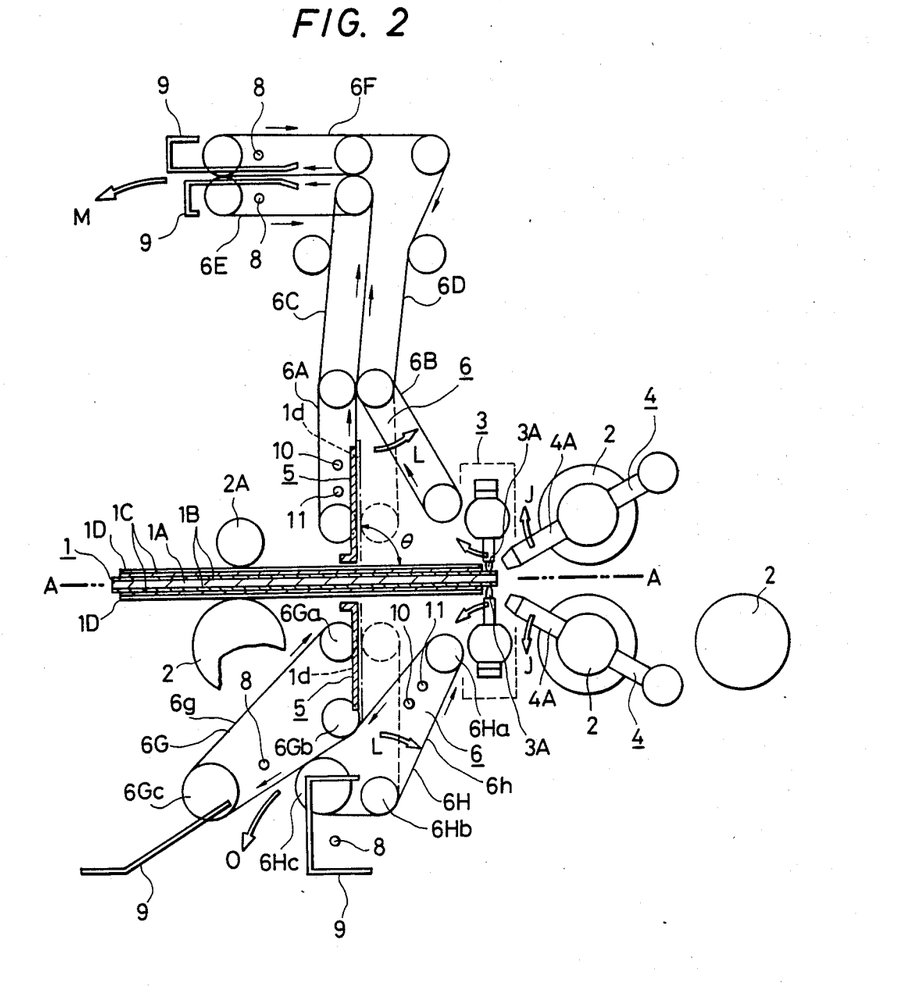
FIG. 2 is an enlarged side view of the principal portion of FIG. 1.

According to the present invention, the mechanism for conveying a board in the film peeling apparatus mainly comprises conveyance driving rollers 2 for conveying a board 1, as shown in FIGS. 1 and 2.

In the above-described conveyance mechanism, a projected press mechanism 3, a fluid injection mechanism 4, a peel angle setting plate (auxiliary peeling plate) 5 and a film delivery mechanism (film conveyance apparatus) 6 are arranged along the conveyance path A—A.

In the board 1, a conductive layer is of copper or the like is formed on one or both sides of an insulated substrate 1A, as shown in FIG. 2. A laminate consisting of a photosensitive resin layer 1C and a translucent resin film (or a protective film) 1D is thermally formed on the conductive layer 1B of the board 1 under pressure. The photosensitive resin layer 1C has been exposed to light in a predetermined circuit pattern.

The conveying rollers 2 are so designed as to convey the board 1 in the direction of the arrow A, as shown in FIG. 1.

Figure 3:
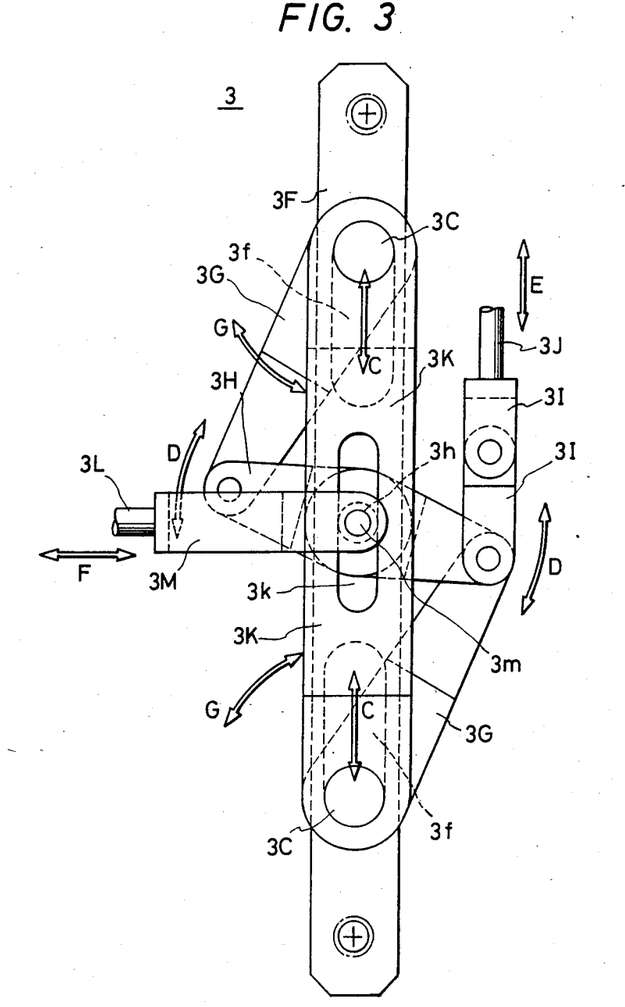
FIG. 3 is a view showing the projected press mechanism of FIGS. 1 and 2.
Figure 4:
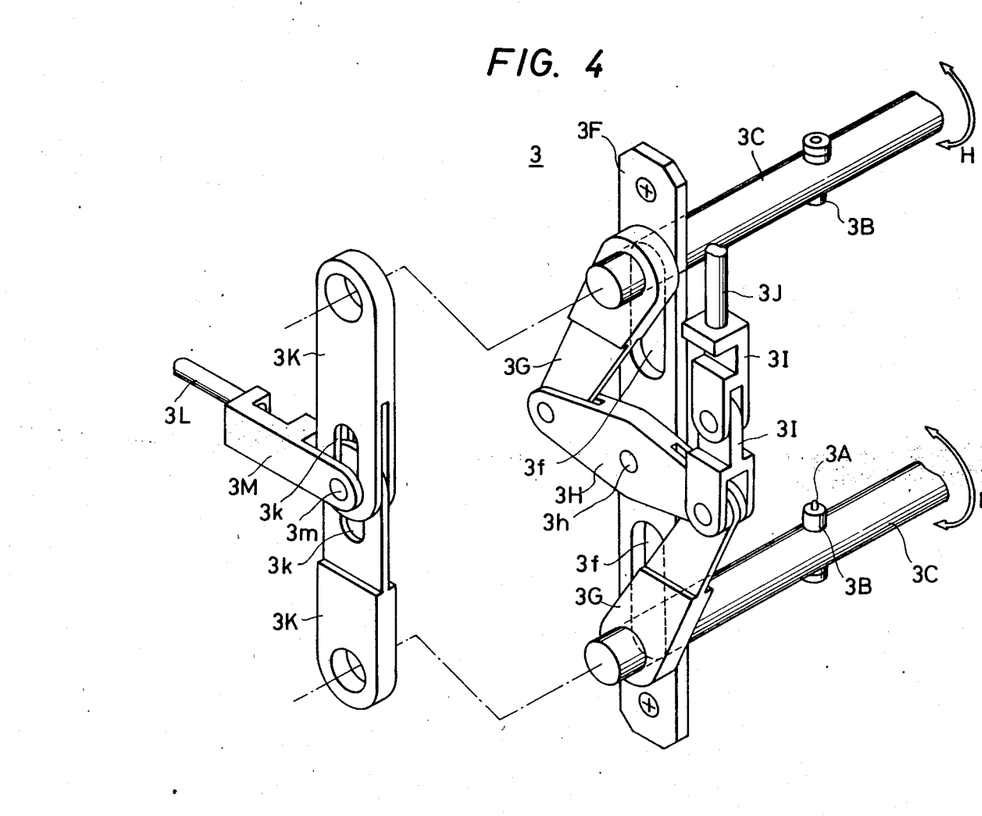
FIG. 4 is an enlarged exploded view of FIG. 3.
Figure 5:
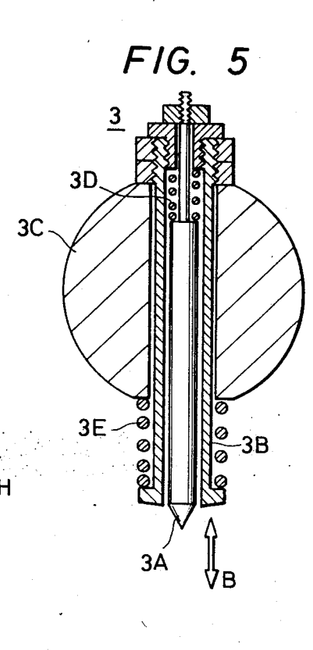
FIG. 5 is a partial sectional view of the projected press member of FIG. 4.

The projected press mechanism 3 is constructed as shown in FIGS. 3 to 5.

The projected press mechanism 3 comprises a plurality of projected press members 3A installed on both sides of the board 1. The projected press members 3A are arranged in the direction across the conveyance direction (the crosswise or transverse direction of the printed circuit board 1). The projected press member 3A is needle-shaped as shown in FIG. 5 and formed so that the end of the laminated body comprises of the photosensitive resin layer 1C and the translucent resin film 1D is pressed by the front end of the projected press member 3A. The projected press member 3A is arranged so that the press member is not entered into the interface between the conductive layer 1B and the photosensitive resin layer 1C when the projected press member 3A presses the end of the laminated body. A tip end angle of the projected press member 3A is about 60 degrees. The members 3A arranged opposite to each other are supported by projected press member supporting rotary shafts 3C through holders 3B, respectively. The holder 3B is installed in such a manner as to slide along the through-hole (which is not supplied with a numeral or character) of the rotary shaft 3C.

A resilient member 3D is installed between the member 3A and the holder 3B. Another resilient member 3E having a resiliency which is the same with or different from that of the resilient member 3D is installed between the holder 3B and the projected press member supporting rotary shaft 3C. The resilient members 3D and 3E are installed in the direction of an arrow B, and act i.e., bias the press member 3A in a direction toward the board 1. Accordingly, the position of the front end of the projected press member 3A with respect to the rotary shaft 3C can be changed by an applied pressures in the direction of the arrow B.

One end (or both ends) of the rotary shaft 3C is, as shown in FIGS. 3, 4, rotatably coupled to one end of a moving arm member 3G through a guide slit 3f made in a guide member 3F. The guide member 3F is fixed to the apparatus body with machine screws and the like (not shown). The guide slit 3f is formed in the direction (of an arrow C) approaching to or departing from the board 1 so as to guide the rotary shaft 3C, i.e., the projected press member 3A in the direction of an arrow C.

The other end of each moving arm member 3G is rotatably secured to one of the opposite ends of a rotary arm member 3H secured rotatably on the rotary shaft 3h in the direction of an arrow D. The rotary arm member 3H is capable of moving each moving arm member 3G in the longitudinal direction of an arrow C.

The guide member 3F, the moving arm member 3G and the rotary arm member 3H for guiding the projected press member supporting rotary shaft 3C constitute the link mechanism of the projected press mechanism 3 for causing the projected press members 3A installed on both sides of the printed circuit board 1 to move close to and away from each other by the movement of the shaft 3J of the driving source for both side use in the direction of an arrow E. The shaft 3J is coupled to one end of the rotary arm member 3H through an arm coupling member 3I. The members constituting the link mechanism each are prepared from material relatively hardly deformable against external force, such as iron, aluminum alloy and rigid plastics. As a driving source a pneumatic or hydraulic cylinder, or a solenoid can be used. The shaft 3J is not limited to be coupled to one end of the rotary arm member 3H. The shaft 3J may be coupled to one end of the moving arm member 3G through the arm coupling member 3I.

By thus coupling the projected press member 3A to the driving source by means of the link mechanism, the projected press members 3A installed on both sides of the board 1 each may be caused to contact with or depart from the surface of the board 1. The projected press member 3A moves in the direction of the arrow C. In other words, the link mechanism is capable of driving the projected press members 3A on both sides by one driving source for both side use. Therefore, it is unnecessary to provide individual driving sources for driving the projected press members 3A on each side of the board 1.

Material forming the guide member 3F, the moving arm members 3G and the rotary arm member 3H constituting the link mechanism are rigid. The operating range of them is defined by guide slot 3f and the rotary shaft 3h. Therefore, the projected press members 3A on both sides of the board 1 can be controlled accurately, with the operating amount and operating time of the projected press members 3A on both sides being almost equal to each other.

The link mechanism for coupling each of the projected press members 3A and the single driving source can be made simpler in construction than when formed with a rack and pinion or gear mechanism, since the number of parts required is smaller and each part is simpler in configuration.

A projected press member rotating arm member 3K is installed at the end (or both ends) of each projected press member supporting rotary shaft 3C linked with the moving arm member 3G in such a manner that one end of the rotating arm member 3K is fixed to the end of the rotary shaft 3C. At the other end of each rotating arm member 3K, there is a slot 3k. The shaft 3m of the arm coupling member 3M connected to the shaft 3L of the single driving source is passed through the slot 3k. In other words, the rotating arm member 3K is coupled to the shaft 3L of the single driving source through the coupling arm member 3M. A driving source similar to what is applied to the above-described link mechanism may be used.

When the shaft 3L moves in the direction of an arrow F, the rotating arm member 3K rotates in the direction of the arrow G and the rotary shaft 3C rotates in the direction of an arrow H, so that the projected press member 3A presses the end of the laminated body. In other words, the rotating arm member 3K and the arm coupling member 3M constitute the projected press member pressing mechanism of the projected press mechanism 3.

The projected press member pressing mechanism thus constructed is capable of operating the projected press members 3A on both sides of the printed circuit board 1 with one driving source and is capable of controlling the operating quantity and time thereof accurately, as in the case of the link mechanism for causing the projected press members 3A to project toward each other and retract away from each other.

Moreover, the projected press member pressing mechanism can simplify the coupling mechanism for coupling the projected press member 3A and the single driving source.

The projected press mechanism 3 thus comprises the projected press members 3A, the link mechanism for causing the projected press member 3A to near and depart from the board 1, and the projected press member pressing mechanism for pressing the end of the laminated body with the projected press member 3A.

Although the link mechanism or projected press member pressing mechanism and the driving source are installed on one side of the projected press member supporting rotary shaft 3C, they may be installed on both sides according to the present invention.

Referring to FIGS. 1 through 7, the operation of the projected press mechanism 3 will be described briefly.

A thin film end detector (not shown) is used first. As a thin film end detector, touch sensor for electrically detecting the end of a thin film laid on the board 1 or a photosensor for detecting the same optically can be used.

When the end of a thin film stuck onto the board is detected by the thin film end detector, a pinch roller 2A shown in FIGS. 1 and 2 is pressed against the board 1 using a press means (not shown), and the conveyance of the board 1 is temporarily stopped by the pinch roller 2A and a conveyance driving roller 2. At this time, the board is prevented from moving, since material such as rubber having a high coefficient of friction is attached to the outer peripheral surface of the conveyance driving roller 2 opposite to the pinch roller 2A. Therefore, the conveyance of the board 1 is stopped securely, so that the board 1 is fixed.

Figure 6:
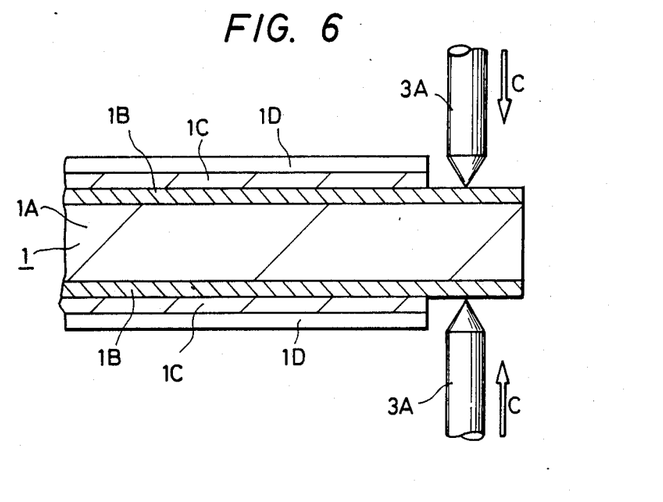
FIGS. 6 and 7 are sectional views of the principal portions of the board of FIG. 2.

The shaft 3J of the driving source coupled to the link mechanism is moved in the direction of an arrow E (upward in the FIG. 3). This operation allows the link mechanism constituted by the rotary arm member 3H, the moving arm member 3G and the guide member 3F to operate, so that the rotary shaft 3C is caused to move in the direction of the arrow C. As a result of which each of the front ends of the projected press members 3A on both sides of the printed circuit board 1 contacts the surface of the conductive layer 1B at the end of the laminated body as shown in FIG. 6. The tip end of the projected press member 3A contacts the surface of the conductive layer 1B with a suitable pressing force such that the resilient member 3D (3E) may have energy.

Figure 7:
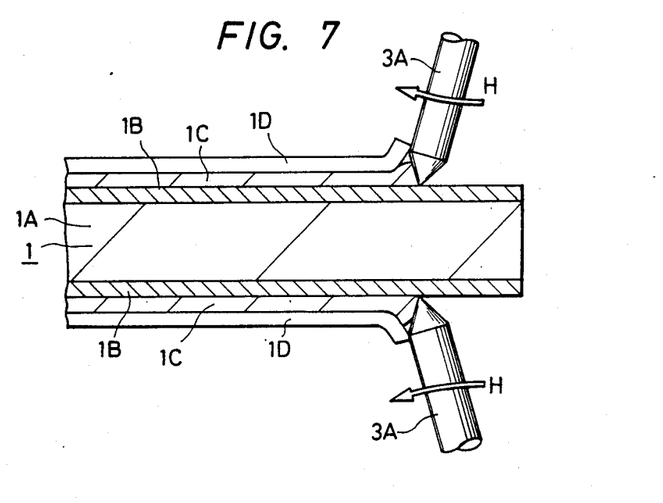

While the projected press member 3A is in contact with the conductive layer 1B, the shaft 3L of the driving source coupled to the projected press member pressing mechanism is moved in the direction indicated by an arrow F (to the left in the FIG. 3). This movement of the shaft 3L causes the projected press member pressing mechanism comprising the rotating arm member 3K and the arm coupling member 3M to operate, so that the rotary shaft 3C is rotated in the direction of the arrow H. By the rotation of the rotary shaft 3C, the front ends of the projected press members 3A on both sides of the board 1 press against the end of the laminated body, as shown in FIG. 7.

The end of the laminated body having the photosensitive resin layer 1C and the translucent resin film 1D is pressed by the projected press members 3A, so that a part of the translucent resin film 1D is peeled off from the photosensitive resin layer 1C, and a gap is produced at the interface between the film 1D and the layer 1C, as will be described hereinafter. The photosensitive resin layer 1C is prepared from material softer than that for the translucent resin film 1D. Therefore, the film 1C is apt to be subjected to plastic deformation by the pressure applied by the projected press member 3A than the layer 1D. Therefore, first, only the film 1C is deformed. The adhesion of the layer 1D to the film 1C reduces, before the layer 1D is deformed. Therefore, a gap is produced between the film 1C and the layer 1D.

Moreover, the end of the translucent resin film 1D can be peeled off by the needle-shaped projected press member 3A which is simple in configuration.

Since the projected press member 3A is installed in the conveyance path of the board, the end of the translucent resin film 1D can automatically be peeled off.

A plurality of projected press members 3A are provided in the direction crossing (crosswise direction) the conveyance direction of the printed circuit board 1 according to this embodiment, in order that the film of the laminated body which is heat bonded on the printed circuit board 1 can be peeled off surely whether properly or improperly heat bonded thereto. However, the present invention is not limited to the above structure. In other words, the projected press mechanism 3 may be so arranged as to have only one projected press member 3A on the respective sides of the board 1, if the end portion of the photosensitive resin layer 1C and the translucent resin film 1D is pressed so that the film 1D can be surely peeled off.

Although the projected press members 3A are arranged in the direction (crosswise direction) crossing the conveyance direction of the board 1 according to this embodiment, the projected press members 3A may be arranged at the end portions or portions close to the corner of the laminated body, in the same direction as the conveyance direction of the board 1. In this case, the nozzle 4A of the fluid injection mechanism 4 is set close to the projected press member 3A.

The projected press member pressing mechanism of the projected press mechanism 3 according to this embodiment of the present invention is arranged in the form of the link mechanism. However, the projected press member pressing mechanism according to the present invention may be so constructed that the board 1 is carried slightly by the rotation of the conveyance driving roller 2 (or the pinch roller 2A) with the projected press member 3A being in contact with the surface of the board 1 at the end of the laminated body, and the end of the laminated body is pressed by the projected press member 3A. That is, the projected press member pressing mechanism may be constructed so as to make use of the conveyance mechanism to help in the peeling process.

Moreover, the cross section of the rotary shaft 3C in the direction across the axis of the shaft according to the present invention may be square, in order to increase the accuracy of forming the through-hole into which the holder 3B is fitted and in order to facilitate the process of forming of the through-hole.

As shown in FIGS. 1 and 2, the fluid injection mechanism 4 may be so arranged as to jet pressurized fluid such as air or inactive gas or liquid such as water out of the nozzle 4A directly to the gap between the photosensitive resin layer 1C and the peeled translucent resin film 1D. The fluid injection mechanism is also positioned close to the projected press mechanism 3 so that the fluid can instantly be sent to the gap upon its creation. The fluid injection mechanism 4 is provided with the nozzle 4A with its set angle being variable in the direction of an arrow J. As a result, the fluid injection mechanism 4 sets its nozzle 4A close to the gap between the layers 1C and 1D at the time of injecting the fluid, and after the fluid has been injected, the fluid injection mechanism 4 moves the nozzle 4A back to the position where the nozzle is prevented from touching the board 1.

By the fluid injection mechanism 4, fluid is blown into the gap between the photosensitive resin layer 1C and the translucent resin film 1D produced under the pressure of the projected press member 3A, as a result of which substantially instant peeling of the translucent resin film 1D off the photosensitive resin layer 1C is ensured.

Figure 8:
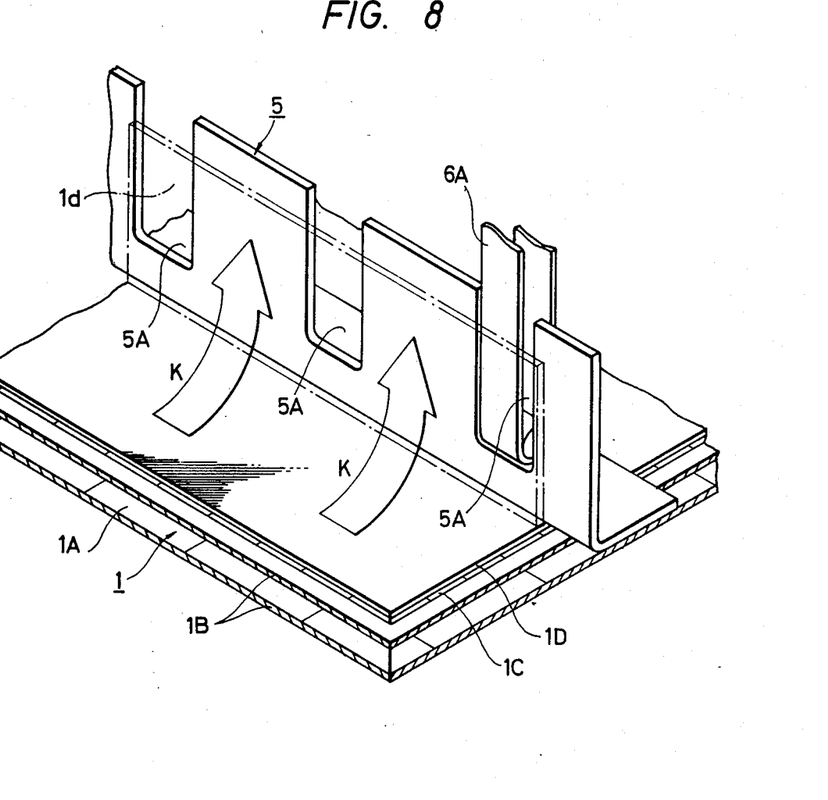
FIG. 8 is a perspective view of the principal portions of the peel angle setting plate of FIGS. 1 and 2.

As shown in FIGS. 2 and 8, the front end 1d of the translucent resin film in the conveyance direction thereof peeled off by the fluid injection mechanism 4 is held against the peel angle setting plate (auxiliary peeling plate) 5 by the fluid pressure, and the peel angle θ for the peel position and direction is set. The translucent resin film 1d is shown by one-dot-and-dash line of FIGS. 2 and 8. The peel angle θ is the angle of the translucent resin film 1d pulled up with respect to the translucent resin film 1D stuck onto the board 1 (or the board 1). The peel angle θ is set to about 90 degrees.

The peel angle setting plate 5 is installed such that the front end of the setting plate 5 (peel position) on the peeling side is spaced from the translucent resin film 1D on the printed circuit board 1 to provide a clearance such that the setting plate will not brush with the resin film 1D to prevent the photosensitive resin layer 1C from being damaged or broken down. Furthermore, the peel angle setting plate 5 is movably arranged so that the end of the setting plate 5 will be tightly held against the translucent resin film 1D during the time the fluid is being sprayed, for preventing reduction of the peel effect, since the reduction of the peel effect is caused if the fluid is blown through between the end of the peel angle setting plate 5 and the board. Moreover, the front end of the setting plate 5 is in a circular arc form with its curvature radius being small, that is, its curvature radius being less than 3 mm.

Moreover, the setting plate 5 has its front end located closer to the printed circuit board 1 than the thin film delivery mechanism 6. The setting plate 5 extends in the peel direction (film delivery direction) with a predetermined length. The setting plate 5 extends in a crosswise direction of the peeled film crossing the film peeling direction with its length being enough to cover the width of the conveyance path of the printed circuit board 1 or the fluid injection width in the peel direction. In other words, the setting plate 5, as the direction of the fluid flow is shown by an arrow K in FIG. 8, is capable of increasing the peeling effects, by preventing the fluid from being jetted to the rear side of the setting plate 5 and the plate 5 is capable of increasing the adhesion of the peeled translucent resin film 1d to the plate 5.

The plate 5 is fixed to the apparatus body at a predetermined position spaced from the nozzle 4A in the fluid flowing direction.

The plate 5 is able to stabilize the peel position and add uniform peeling force to the translucent resin film 1D. Accordingly, the peel angle setting plate 5 prevents the peel position from shifting when the translucent resin film 1D is being peeled off and prevents peel stress from distorting and the photosensitive resin layer 1C from being damaged or broken.

The peel angle θ of the peel angle setting plate 5 with respect to the translucent resin film 1D may be set variable within the range of obtuse to right angle, according to changes in conditions, such as change of material for the translucent resin film 1D, change of the fluid pressure in the fluid spray mechanism 4, etc. Moreover, the peel angle setting plate 5 may be so arranged as to be movable, in corresponding to the thickness of the board 1, the photosensitive resin layers 1C or the translucent resin films 1C. The plate 5 may be moved or transferred by an air or hydraulic cylinder.

Figure 9:
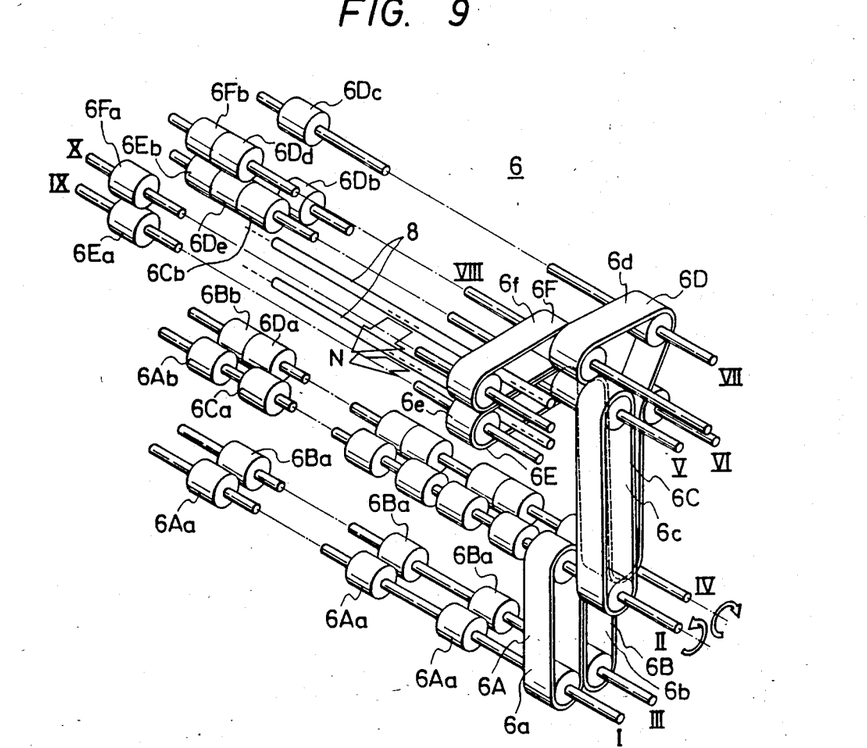
FIG. 9 is an expanded exploded perspective view of the film conveyance mechanism of FIGS. 1 and 2.

The translucent resin film 1d pressed against the peel angle setting plate 5 by the fluid injection mechanism 4 is, as shown in FIGS. 1, 2 and 9, carried out by the film carrying out mechanism (thin film conveyance mechanism) 6 while the thin film is being peeled off.

The thin film conveyance mechanism 6 comprises an upper conveyor belt mechanism and a lower conveyor belt mechanism installed on both sides of the printed circuit board 1, respectively.

The upper conveyor belt mechanism consists of, as shown in FIG. 9 in detail, fixed conveyor belts 6A, 6C, 6D, 6E, 6F and moving conveyor belts 6B.

The fixed conveyor belt 6A consists of a roller 6Aa supported by a driven shaft I, a roller 6Ab supported by a driving shaft II and a belt 6a wound on the rollers 6Aa, 6Ab.

The moving conveyor belt 6B consists of a roller 6Ba supported by a driven shaft III, a roller 6Bb supported by a driving shaft IV and a belt 6b wound on the rollers 6Ba, 6Bb. The moving conveyor belt 6B is rotated on the driving shaft IV in the direction of an arrow L as shown in FIG. 2. The moving conveyor belt 6B facilitates the adhesion of the peeled translucent resin film 1d to the peel angle setting plate 5 and is capable of carrying the translucent resin film 1d by sandwiching it between the moving conveyor belt 6B and the fixed conveyor belt 6A. The operation of sandwiching the translucent resin film 1d between the fixed and moving conveyor belts 6A, 6B is conducted through a cut 5A provided in the setting plate 5, as shown in FIG. 8. The cut 5A is designed to help the conveyor belts 6A, 6B sandwich the translucent resin film 1d whose peel position and angle have been set by the setting plate 5 when both the belts 6A, 6B reach the translucent resin film 1d. As a result, it is assured that the translucent resin film 1d is sandwiched between the fixed and moving conveyor belts 6A, 6B.

The fixed conveyor belt 6C consists of a roller 6Ca supported by the driving shaft II, a roller 6Cb supported by a driven shaft V and a belt 6c wound on rollers 6Ca, 6Cb.

The fixed conveyor belt 6D consists of a roller 6Da supported by the driven shaft IV, a roller 6Db supported by the driven shaft VI, a roller 6Dc rupported by a driven shaft VII, a roller 6Dd supported by a driven shaft VIII, a roller 6De supported by the driven shaft V and a belt 6d wound on rollers 6Da to 6De.

Figure 10:
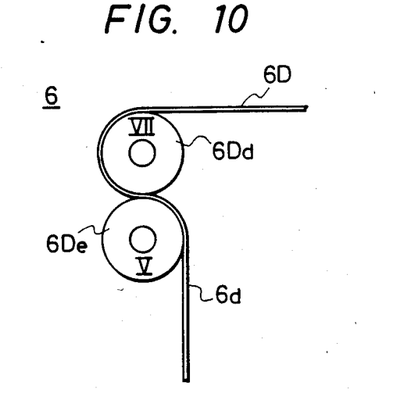
FIGS. 10 is a sectional view of the principal portions of the film conveyance mechanism of FIG. 9.

The fixed conveyor belts 6C and 6D are so arranged as to further carry out the translucent resin film 1d carried out by the fixed and moving conveyor belts 6A and 6B. The roller 6De of the fixed conveyor belt 6D is intended to comply with the change of the conveyance direction at a large angle when the translucent resin film 1d is carried out from the fixed conveyor belts 6C, 6D to the fixed conveyor belts 6E, 6F, as shown in FIG. 10. In other words, the curvature radii of the belts 6c and 6d, on their surfaces contacting with the translucent resin film 1d at the position where the conveyance direction is changed are made equal to each other by the roller 6De. Accordingly, the translucent resin film 1d is prevented from producing wrinkles and trouble such as a jam during conveyance.

The fixed conveyor belt 6E consists of a roller 6Ea supported by a driven shaft IX, a roller 6Eb supported by the driven shaft V and a belt 6e wound on the rollers 6Ea, 6Eb.

The fixed conveyor belt 6F consists of a roller 6Fa supported by a driven shaft X, a roller 6Fb supported by the driven shaft VIII and a belt 6f wound by the rollers 6Fa, 6Fb.

As shown in FIGS. 1, 2, the fixed conveyor belts 6E and 6F are so arranged as to discharge the translucent resin film 1d carried by the fixed conveyor belts 6C and 6D from the apparatus body in the direction of an arrow M. A container 7A is provided for containing the peeled upper translucent resin films thus discharged, as shown in FIG. 1. The container 7A is detachably mounted on an upper portion of the apparatus body.

The lower conveyor belt mechanism comprises a fixed conveyor belt 6G and a moving conveyor belt 6H as shown in FIG. 2.

The fixed conveyor belt 6G consists of rollers 6Ga, 6Gc supported by different driven shafts (not shown), a roller 6Gb supported by a driven shaft (not shown) and a belt 6g wound on the rollers 6Ga to 6Gc.

The moving conveyor belt 6H consists of rollers 6Ha and 6Hc supported by different driven shafts (not shown), a roller 6Hb supported by a driven shaft (not shown) and a belt 6h wound on the rollers 6Ha to 6Hc.

The fixed conveyor belts 6G and the moving conveyor belt 6H carry a translucent resin film 1d peeled from the another side of the board, with peeling the film 1d whose peel position and angle are set by the peel angle setting plate 5 as in the case of the above-described upper conveyor belt mechanism. The conveyor belts 6G and 6H discharge the translucent resin film 1d from the apparatus body in the direction of an arrow O. Another container 7B is provided for containing the discharged lower translucent resin films as shown in FIG. 1. The container 7B translucent resin films is detachably mounted on a lower portion of the apparatus body. Moreover, the container 7A for containing the discharged upper translucent resin films is installed above the container 7B, so that area occupied by the containers 7A and 7B is reduced to thereby make the apparatus body compact.

As shown in FIGS. 2 and 9, a fluid spray mechanism 8 for sending a jet of fluid, in the direction of an arrow N, to the translucent resin film 1d being discharged is installed close to each of the conveyance paths on the discharge sides of the fixed conveyor belts 6E, 6F, and 6G and the moving conveyor belt 6H. The angle $\theta$, of the direction in which the fluid is sent out with respect to the translucent resin film 1d being discharged is acute ($0 \leq \theta_1 \leq 90$), to ensure that the translucent resin film 1d is led to the discharge direction by the jet of fluid. The fluid spray mechanism 8 comprises a pipe with outlets from which the fluid is jetted, the outlets being provided between the respective two conveyor belts 6E and 6E (6F and 6F, 6G and 6G and 6H and 6H) disposed adjacent to each other in the crosswise transverse direction to the direction in which the film 1d is being conveyed. As the fluid, gas such as pressurized air or inert gas or the like and liquid such as water or the like may be used. A static eliminator (not shown) for reducing electrification of the translucent resin film 1d is installed close to the fluid sprayer 8.

By thus installing the fluid spray mechanism 8 on the discharge side of each of the fixed conveyor belts 6E, 6F, 6G and moving conveyor belt 6H, the translucent resin film 1d being discharged is prevented from being wound on the fixed conveyor belts 6E, 6F and 6G or moving conveyor belt 6H, and the translucent resin film 1d can be led by the fluid in the direction of the arrow M (or O). As a result, the translucent resin film 1d may be discharged into the container 7A (or 7B) for containing the discharged upper (or lower) translucent resin film 1d efficiently.

Moreover, a roll-in preventing member 9 is installed close to the conveyance path on the discharge side, between the respective two conveyor belts 6E and 6E (6F and 6F, 6G and 6G and 6H and 6H) disposed adjacent to each other in the crosswise direction of the film 1d conveyed crossing the conveyance direction. Accordingly, the translucent resin film 1d is prevented from being wound on the fixed conveyor belts 6E, 6F, 6G or moving conveyor belt 6H.

As shown in FIG. 2, static eliminators 10 and ion dispersion devices 11 are installed close to the fixed conveyor belt 6A and the moving conveyor belt 6H, respectively. The static eliminator 10 is used to discharge ions so that the static electrification of the resin film 1d which occurs when the film 1d is being peeled off or carried can be reduced. The ion dispersion device 11 disperses the ions discharged by the static eliminator 10, in order to efficiently reduce the static electrification of the film 1d. The device 11 disperses ions using pressurized fluid such as air, for example.

The projected press member 3A of the projected press mechanism 3 may be wedge-shaped or plate-shaped instead of needle-shaped according to the present invention.

The present invention is applicable to a thin film conveyance apparatus for a thin film peeling apparatus equipped with a thin film raising mechanism for raising up the end of a translucent resin film 1D with a brush having a plurality of needles on the circumference of a rotary body.

The present invention is also applicable to a thin film delivery apparatus for a thin film peeling apparatus equipped with a thin film raising mechanism for pressing the end of a translucent resin film 1D with a knurl roll and raising that portion.

The present invention is further applicable to a thin film delivery apparatus for a thin film peeling apparatus for peeling a translucent resin film 1d by raising an end portion of the film by the projected press mechanism 3 and pressing the end portion with an adhesion member to be stuck thereto.

The present invention is further applicable to a thin film conveyance apparatus for an apparatus for peeling a protective film stuck to a decorative laminated sheet as building material.

As set forth above, the present invention has the following effects:

According to the present invention, a film conveying apparatus is provided with a fluid spray mechanism for spraying fluid in substantially a film discharging direction of the film conveyor. Therefore, due to the sprayed fluid, a film being discharged is prevented from being wound on the film conveyor belt. Furthermore, a thin film being discharged can be guided surely in the film discharging direction. As a result, films can be efficiently discharged into a container.

Figure 11:
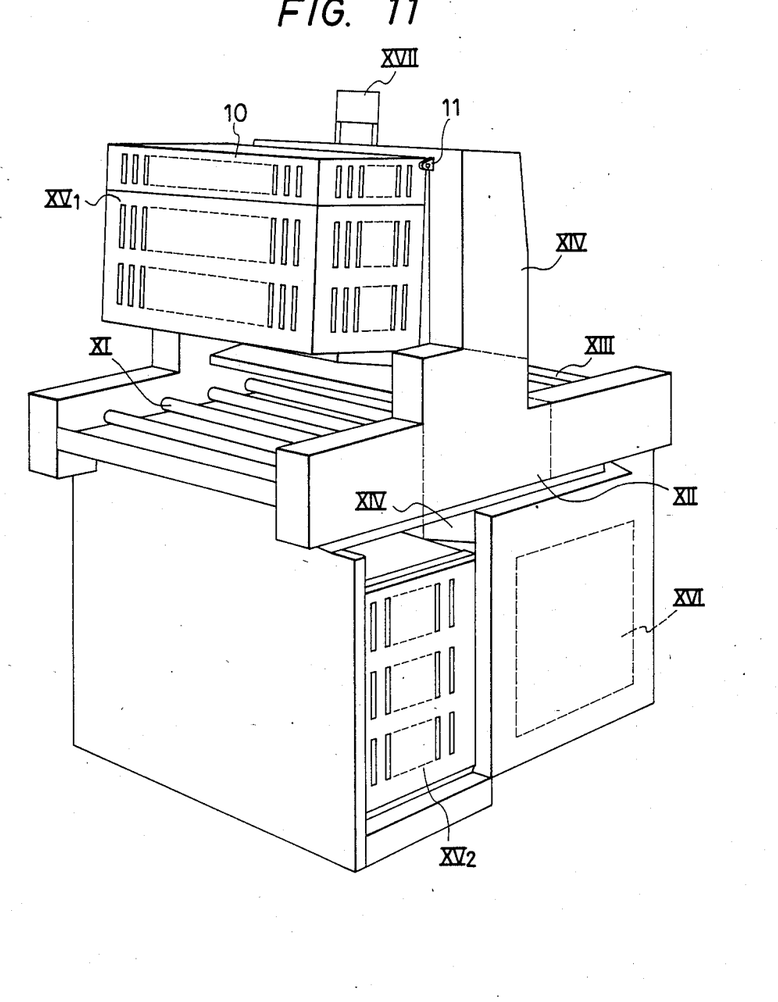
FIG. 11 is an outer perspective view showing schematically an apparatus for peeling a protective film off from a board according to the present invention.

As shown in FIG. 11, the film peeling apparatus, with containers for containing peeled films, having the film conveying apparatus therein according to the present invention comprises a board-feed-side conveying portion XI, film peeling portion XII, a board-discharge-side conveying portion XIII, peeled film discharge conveying portion XIV for conveying the peeled films, peeled and discharged film containing portions XV1 and XV2, a control portion XVI, and a display means XVII for reporting nonconforming articles, problems and misoperations.

Figure 12:
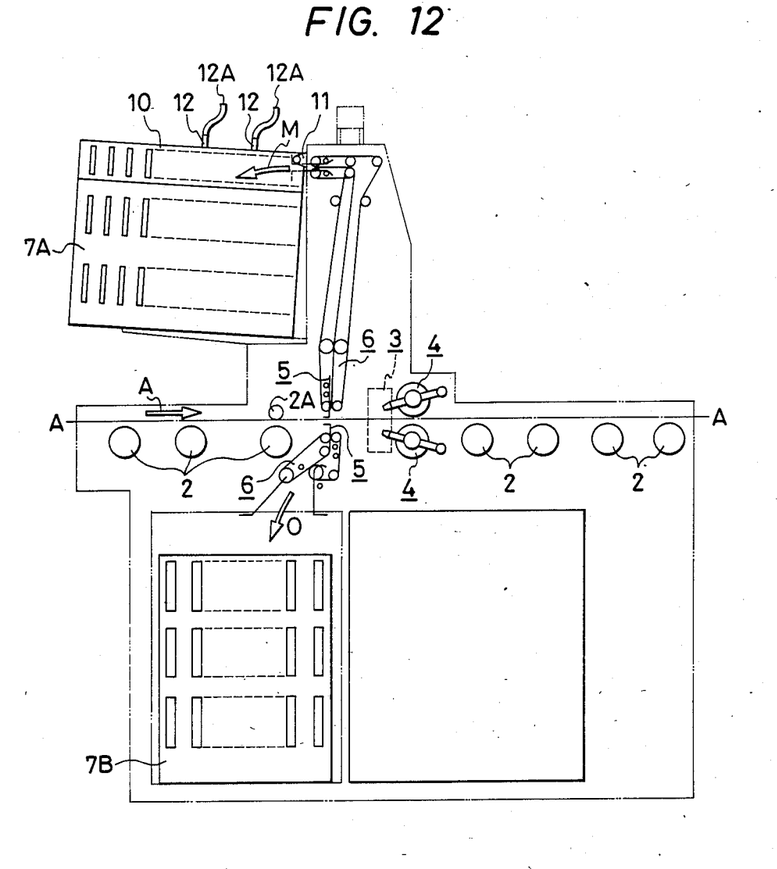
FIG. 12 is a side view showing schematically the apparatus of FIG. 11, without its cover.

A conveying mechanism for conveying printed circuit boards in the protective film peeling apparatus according to the present invention is, as shown in FIG. 12, mainly formed with driving rollers 2 for carrying printed circuit boards.

The protective film peeling apparatus according to the present invention is equipped with a projected press mechanism 3, a fluid spray mechanism 4, peel-angle setting plates 5 and a film discharge mechanism 6, on the conveying path A—A of the conveying mechanism.

Figure 13:
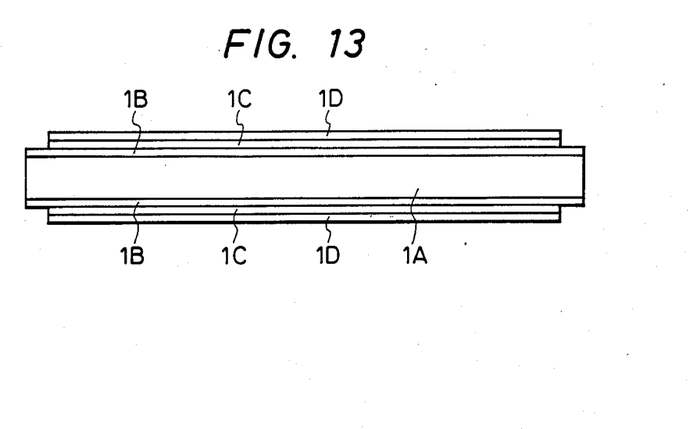
FIG. 13 is a sectional view showing the construction of a printed circuit board.

As shown in FIG. 13, a board 1 for a printed circuit board comprises a laminate consisting of a photosensitive resin (photoresist) layer 1C and a translucent resin film (protective film) 1D for protecting the photosensitive resin layer thermally formed under pressure on a conductive layer 1B formed on each (or one) side of an insulating base 1A of resin or the like.

The display means XVII for reporting nonconforming articles, etc. is so arranged as to report the existence of a nonconforming article by coloring its underside yellow and that of a trouble or misoperation by coloring its upside red, for example.

The peeled and discharged film containing portions XV1, XV2 have, as shown in FIGS. 11 and 12, peeled film containers 7A and 7B used to contain the translucent resin films 1D peeled off by the projected press mechanism 3, the fluid spray mechanism 4, and the peel angle setting plates 5 and conveyed and discharged by the film conveyance mechanism 6.

As shown in FIG. 11, the peeled film containers 7A and 7B are respectively arranged upon and below the board conveyance path on the board-feed-side of the position where the film is peeled off from the printed circuit board, i.e., in front (in the left side; FIG. 12) of the peel-angle setting plates 5 and the film conveyance mechanism 6.

Since the peeled film containers 7A and 7B are respectively arranged upon and below the board conveyance path on the board-feed-side of the film peeling position, the length of the peeled film conveyors of the film conveyance mechanism 6 can be decreased.

Moreover, since the peeled film containers 7A, 7B are arranged three-dimensionally above and below the carrier passage of the board 1, the floor area where the apparatus is installed can also be decreased.

The peeled film containers 7A, 7B according to the present invention are so constructed that platelike materials are used to constitute all the side boards of the peeled film containers 7A, 7B. Furthermore, it is preferred that the side boards of the peeled film containers 7A and 7B are formed by members, through which air flows freely so that air inside of the peeled film containers 7A, 7B can flow out.

As such members, platelike materials having slits of any form such as strips or rectangular form, square form, circular form or anisotropic form, netlike materials, gridlike materials or materials having barlike or linear materials arranged in the same direction or set to cross with each other with any space interval may be used.

With respect to the size of each slit, grid or the like, it should be so arranged as to prevent films contained in each peeled film container 7A or 7B from slipping out, through the slit or the like.

The slits and the like may be provided at the whole surface of the side board or in some parts thereof. When they are provided in some parts thereof, they should preferably be formed in its upper instead of lower part.

Moreover, each of the peeled film containers 7A, 7B may be a combination of platelike materials with and without the slits.

Furthermore, each of the peeled film containers 7A, 7B may be supported to the film peeling apparatus proper, removably or slidably fitted thereto.

Each of the peeled film containers 7A, 7B may still be so arranged that the side board thereof is openable. In this case, especially when the container itself is fixed to the apparatus, what is contained therein can readily be taken out.

As an example of the mode in which the peeled film containers 7A and 7B are slidably supported to the apparatus, the peeled film containers 7A and 7B are equipped with rollers fitted to the undersurface thereof, and the film peeling apparatus is equipped with rails, whereby the containers can be taken out. Or otherwise, each of the peeled film containers 7A, 7B is made rotatable with its lower corner edge as a fulcrum, so that what is contained in the containers can be taken out.

The container 7A located in the upper position should preferably be so arranged that its one side where the peeled films are discharged from the discharge conveyor and dropped thereat is set lower than the other to form an incline, thereby the peeled film container 7A is prevented from falling down at not only normal time but also the oscillation time. Stability is thus improved.

Material for forming and constructing the peeled film containers 7A, 7B is not limited to a particular one but may be any one of the metal, synthetic resin and wood. When a transparent material is used, it is a practical convenience that the number of peeled films in the container can be checked from the outside.

Since the side boards (bottom boards, if necessary) of the peeled film containers 7A and 7B thus constructed are provided with the slits, an amount of peeled films corresponding to the internal volume of the peeled film containers 7A, 7B can certainly be contained therein.

Since the containers 7A and 7B are provided with the slits according to the present invention, the air is forced out of the peeled film containers 7A, 7B by the thin materials (films) discharged into the containers, allowing the air resistance affecting the falling thin materials to be reduced. In consequence, the thin materials can be contained in the peeled film containers 7A, 7B in such a manner that they have been piled up. Therefore, the thin materials are contained in a compact form. Accordingly, films with their amount corresponding to the internal volume of the containers can be surely contained therein.

Moreover, the quantity of those contained can be checked through the slits made in the peeled film containers 7A and 7B, so that work control can be facilitated.

Figure 14:
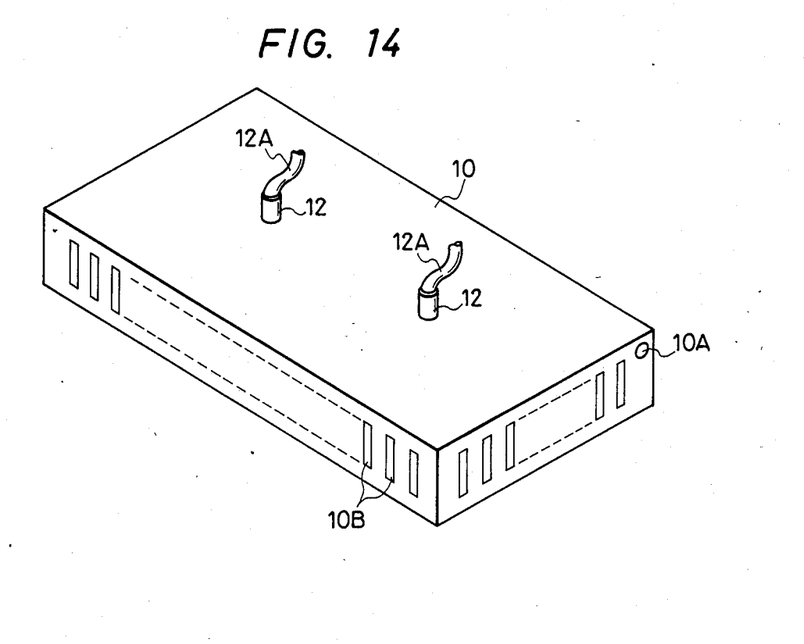
FIG. 14 shows the construction of a peeled film induction member.

As shown in FIGS. 11 and 12, a peeled film induction member 10 shown in FIG. 14 is rotatably fitted by a mounting shaft 11 through a mounting hole 10A to the cover of the peeled film discharge conveying portion XIV in such a manner as to cover a peeled film inserting portion in the upper portion of the upper peeled film container 7A. Slits 10B for letting air escape are opened in the sides of the peeled film induction member 10. The peeled film is thus prevented from ascending, since the air inside the peeled film induction member 10 flows out so that air does not flow on the surface of the peeled film toward the upper portion of the peeled film container 7A.

As set forth above, the present invention has the following effects:

Since the peeled film container is arranged above the board conveyance path in the board-feed-side of the film peeling position, the length of the film discharge conveyors of the film discharge conveyance mechanism can be reduced.

Furthermore, according to the present invention, the peeled film container is arranged three-dimensionally above the carrier passage of the board, the floor area required for the installation of the apparatus is reduced.

When the peeled films are contained in the peeled film container, the air inside the peeled film containers is forced out of them through the slits provided in the side boards (bottom boards, if necessary) constituting the container, to ensure that the peeled films are contained in the containers.

As the quantity of films contained in the peeled film containers can be chacked through the slits, work control can be facilitated.

Although the invention is described in its preferred form with a certain degree of particularity, it is believed obvious that various changes and modifications may be made in the invention without departing from the spirit and scope thereof.

I claim:

1. A film conveying apparatus for conveying a film peeled from a laminate structure, the conveying apparatus comprising:
   a conveyance means for conveying the peeled film and discharging the film in a film discharge direction; and
   fluid spray means for spraying a fluid substantially in the film discharging direction of said conveyance means, wherein the conveyance means comprises a plurality of pairs of opposing conveyor belts for conveying the peeled film while held therebetween, at least two of said pairs of belts are aligned in a direction transverse to said conveyance direction, and said fluid spray means comprises a plurality of pipes having spraying holes formed therein, said pipes being disposed so as to extend in the transverse direction with said spraying holes disposed between said two of said pairs of belts, and said pipes extending through one of said conveyor belts in each of said two of said pairs.

2. A film conveying apparatus for conveying a film peeled from a laminate structure, the conveying apparatus comprising:
   conveyance means for conveying the film peeled from the laminate structure and discharging the film in a film discharge direction at a film discharge position;
   fluid spray means for spraying a fluid substantially in the film discharging direction of said conveyance means; and
   container means for receiving and containing the film conveyed by said conveyance means to said film discharge position, said container means being disposed above a portion of a laminate structure conveying path upstream of a position at which the film is peeled, wherein said container means has side boards, and at least one of said side boards is formed of a member adapted to allow a circulation of air from and to the inside of said container means, further wherein said member adapted to allow circulation of air is formed with plate like materials having at least one of slits, netlike, gridlike, barlike or linear materials arranged in the same direction or transverse to each other at any desired spacing.

3. A film conveying apparatus as claimed in claim 2, wherein said peeled film container is fixed to said apparatus.

4. A film conveying apparatus as claimed in claim 3, wherein said container means has side boards, and at least one of said side boards is openable.

5. A film conveying apparatus as claimed in claim 2, wherein said container means is removable from said apparatus.

6. A film conveying apparatus as claimed in claim 2, wherein said container means is slidably supported on said apparatus.

7. A film conveying apparatus for conveying a film peeled from a laminate structure, the conveying apparatus comprising:
   conveyance means for conveying the film peeled from the laminate structure and discharging the film in a film discharge direction at a film discharge position;
   fluid spray means for spraying a fluid substantially in the film discharging direction of said conveyance means; and
   container means for receiving and containing the film conveyed by said conveyance means to said film discharge position, said container means being disposed above a portion of a laminate structure conveying path upstream of a position at which the film is peeled, wherein said peeled film container disposed on said apparatus is inclined toward said film discharge position.

8. A film conveying apparatus comprising:
   conveyance means for conveying a peeled film and discharging the film in a film discharge direction; and
   fluid spray means for spraying a fluid substantially in the film discharging direction of said conveyance means, wherein the conveyance means comprises a plurality of pairs of opposing conveyor belts for conveying the peeled film while held therebetween, at least two of said pairs of belts are aligned in a direction transverse to said conveyance direction, and said fluid spray means comprises a plurality of pipes having spraying holes formed therein, said pipes being disposed so as to extend in the transverse direction with said spraying holes disposed between said two of said pairs of belts, and said pipes extending through one of said conveyor belts in each of said two of said pairs.

9. A film conveying apparatus as claimed in claim 1, wherein the peeled film discharged in the film discharge direction is discharged into a container.

10. A film conveying apparatus as claimed in claim 1, wherein the conveyance means comprises a pair of conveyor belts for conveying the peeled film with the film held therebetween.

11. A film conveying apparatus as claimed in claim 8, wherein the peeled film discharged in the film discharge direction is discharged into a container.

12. A film conveying apparatus as claimed in claim 8, wherein the conveyance means comprises a pair of conveyor belts for conveying the peeled film with the film held therebetween.

13. A film conveying apparatus comprising:
- conveyance means for conveying a film peeled from a laminate structure, and for discharging the conveyed film in a film discharge direction at a film discharge position;
- fluid spray means for spraying fluids substantially in the film discharging direction of said conveyance means; and
- container means for receiving and containing the film conveyed by said conveyance means to said film discharge position, said container means being disposed above a portion of a conveying path for the laminate structure upstream of a position at which the film is peeled, wherein said container means has side boards, and at least one of said side boards is formed of a member adapted to allow circulation of air from inside said container means to outside said container means and from outside said container means to inside said container means, further wherein said member is formed with plate like materials having at least one of slits, netlike, gridlike, barlike and linear materials arranged in the same direction or transverse to each other at a desired spacing.

14. A film conveying apparatus as claimed in claim 13, further comprising a frame, and wherein said conveyance means is mounted on said frame, and said container means is fixed to said frame.

15. A film conveying apparatus as claimed in claim 14, wherein said container means has side boards, and at least one of said side boards is openable.

16. A film conveying apparatus as claimed in claim 13, further comprising a frame, and wherein said conveyance means is mounted on said frame, and said container means is removably attached to said frame.

17. A film conveying apparatus as claimed in claim 13, further comprising a frame, and wherein said conveyance means is mounted on said frame, and said container means is slidably supported on said frame.

18. A film conveying apparatus comprising:
- conveyance means for conveying a film peeled from a laminate structure, and for discharging the conveyed film in a film discharge direction at a film discharge position;
- fluid spray means for spraying fluids substantially in the film discharging direction of said conveyance means; and
- container means for receiving and containing the film conveyed by said conveyance means to said film discharge position, said container means being disposed above a portion of a conveying path for the laminate structure upstream of a position at which the film is peeled, further comprising a frame, and wherein said conveyance means is mounted on said frame, and said container means is disposed on said frame and is inclined toward said film discharge position.

* * * * *